US011735894B2

(12) United States Patent
Olander

(10) Patent No.: US 11,735,894 B2
(45) Date of Patent: Aug. 22, 2023

(54) CABLE POSITIONING ASSEMBLY AND PULLING SYSTEM

(71) Applicant: TT Technologies, Inc., Aurora, IL (US)

(72) Inventor: John A. Olander, Aurora, IL (US)

(73) Assignee: TT Technologies, Inc., Aurora, IL (US)

(*) Notice: Subject to any disclaimer, the term of this patent is extended or adjusted under 35 U.S.C. 154(b) by 152 days.

(21) Appl. No.: 17/223,346

(22) Filed: Apr. 6, 2021

(65) Prior Publication Data

US 2021/0313782 A1    Oct. 7, 2021

Related U.S. Application Data

(60) Provisional application No. 63/006,334, filed on Apr. 7, 2020.

(51) Int. Cl.
*H02G 1/08* (2006.01)

(52) U.S. Cl.
CPC ............ *H02G 1/085* (2013.01); *H02G 1/083* (2013.01); *H02G 1/08* (2013.01)

(58) Field of Classification Search
CPC ........... H02G 1/085; H02G 1/083; H02G 1/08
See application file for complete search history.

(56) References Cited

U.S. PATENT DOCUMENTS

| | | | | |
|---|---|---|---|---|
| 3,968,952 A * | 7/1976 | Newell | ............ | H02G 1/08 |
| | | | | 254/338 |
| 8,016,267 B2 * | 9/2011 | Jordan | ............ | H02G 1/08 |
| | | | | 254/134.3 R |
| 8,434,741 B2 * | 5/2013 | Radle | ............ | H02G 1/06 |
| | | | | 254/134.3 R |
| 9,899,811 B2 * | 2/2018 | Smith | ............ | H02G 1/08 |
| 11,279,600 B1 * | 3/2022 | Jordan | ............ | H02G 1/081 |
| 2003/0098450 A1 * | 5/2003 | Cook | ............ | B66D 1/12 |
| | | | | 254/134.3 R |
| 2014/0131645 A1 * | 5/2014 | Jordan | ............ | H02G 1/085 |
| | | | | 254/134.3 R |

* cited by examiner

*Primary Examiner* — Seahee Hong
(74) *Attorney, Agent, or Firm* — Schwegman Lundberg & Woessner, P.A.

(57) ABSTRACT

A cable pulling system and associated method are shown. Examples include positioning joints that allows a pulling boom to move up or down and side to side, while maintaining alignment of a pulling cable between pulleys. Example methods include positioning a pulling boom within a conduit box and pulling an electrical cable through a conduit into the conduit box.

16 Claims, 6 Drawing Sheets

CABLE POSITIONING ASSEMBLY AND PULLING SYSTEM

CLAIM OF PRIORITY

This patent application claims the benefit of priority, under 35 U.S.C. § 119(e), to U.S. Provisional Patent Application Ser. No. 63/006,334, entitled "CABLE POSITIONING ASSEMBLY AND PULLING METHOD," filed on Apr. 7, 2020, which is hereby incorporated by reference herein in its entirety.

TECHNICAL FIELD

Embodiments described herein generally relate to pulling cables. Selected specific examples relate to pulling cables through conduit into electrical boxes or other enclosures.

BACKGROUND

During construction or maintenance, electrical cables must generally be installed into conduit in order to comply with building codes or other standards. The installation of cables into electrical or conduit boxes is often accomplished by pulling cables through the conduit. A significant amount of force is required due to the weight of the cables, the resistance against the conduit, and the distance to be pulled.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

The following description and the drawings sufficiently illustrate specific examples to enable those skilled in the art to practice them. Other examples may incorporate structural, process, or other changes. Portions and features of some examples may be included in, or substituted for, those of other examples. Examples set forth in the claims encompass all available equivalents of those claims.

A variety of devices and techniques are described in the present disclosure for pulling cables through conduit. Each device or technique can generally involve positioning a power winch, aligning a pulling cable between the power winch and a conduit, including positioning the pulling cable on various guide pulleys that can be mounted to pulling devices. Precise positioning of the pulling cable is desired in order to allow the winch and pulling devices to pull the cable freely through the conduit with minimal resistance. Additional difficulties arise when cables must be pulled into a conduit terminating inside an electrical box or another type of enclosure.

The devices and methods of the present disclosure are intended to address current disadvantages of the devices and techniques used in pulling cables through conduit, by providing a cable positioning assembly and pulling system capable of being assembled and positioned in a reduced amount of time. The cable positioning assembly and pulling system disclosed is also capable of pulling cable directly into a conduit terminating inside an electrical box or another type of enclosure.

Figure 1:
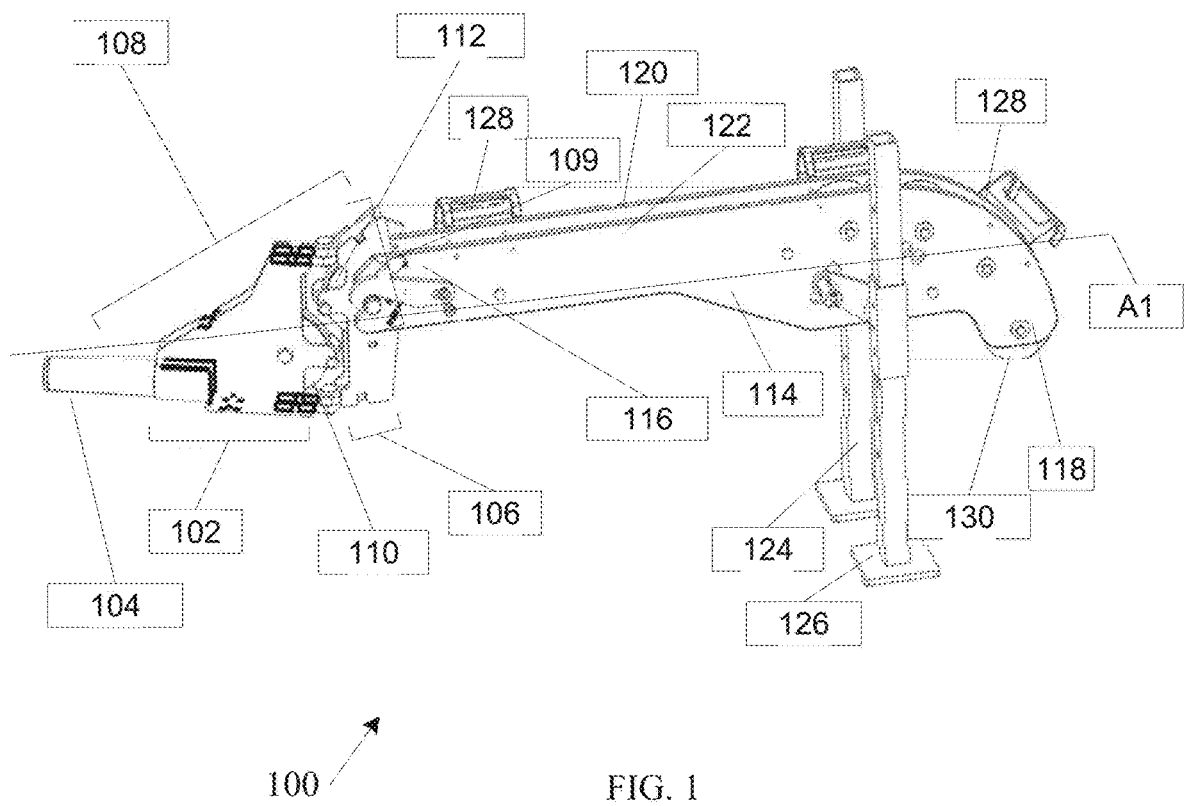
FIG. 1 illustrates an isometric view of a cable positioning assembly and pulling system in accordance with at least one example of the present application.

FIG. 1 illustrates an isometric view of a cable positioning assembly and pulling system 100 in accordance with at least one example of the present application. The cable positioning assembly and pulling system 100 can include a winch mount 102, a winch fitting 104, and a boom mount 106. The winch mount 102 can include a first pulley 110. The boom mount 106 can include a second pulley 112. The winch mount 102 and the boom mount 106 can be pivotably coupled to form a lateral positioning joint 108. The lateral positioning joint 108 can allow for lateral movement between the winch mount 102 and the boom mount 106. The winch mount 102 can include the winch fitting 104. The winch fitting 104 can be configured to couple the winch mount 102 to a power winch.

The cable positioning assembly and pulling system 100 can include a pulling boom 114 including a first end 116 and a second end 118. The first end 116 of the pulling boom 114 and the boom mount 106 can be pivotably coupled to form a vertical positioning joint 109. The vertical positioning joint 109 can allow for vertical movement of the winch mount 102 and the boom mount 106 with respect to the pulling boom 114. The pulling boom 114 can include a first boom plate 120 and a second boom plate 122. A length of the pulling boom 114 can define a central axis A1.

The pulling boom 114 can include a pair of supporting legs 124. The pulling boom 114 can be supported with the supporting legs 124. The supporting legs 124 can be height adjustable. The supporting legs 124 can each include a leg base 126. The leg bases 126 can improve the stability of the pulling boom 114 during a pulling operation. The pulling boom can include one or more handles 128. The cable positioning assembly and pulling system 100 can be lifted, carried, or otherwise positioned with the handles 128.

In the operation of some examples, the cable positioning assembly and pulling system 100 can be used to position a pulling cable coupled to a power winch in preparation for a pulling operation. The lateral positioning joint 108 can allow the first pulley 110 and second pulley 112 to be laterally adjusted with respect to each other to aid in aligning and positioning the pulling cable and pulling boom 114. The vertical positioning joint 109 can allow the pulling boom to be vertically adjusted to aid in aligning and positioning the pulling cable and the pulling boom 114.

The second end 118 of the pulling boom 114 can be positioned within an electrical box or an enclosure. The pulling cable can be run from the power winch to the second end of the pulling boom 114. The pulling cable can be run into a proximal end of a conduit positioned inside the electrical box, and then through to a distal end of the conduit. Electrical cables can be coupled to the pulling cable at the distal end of the conduit, and the power winch subsequently operated to pull the pulling cable and any attached electrical cables into the electrical box.

Figure 2:
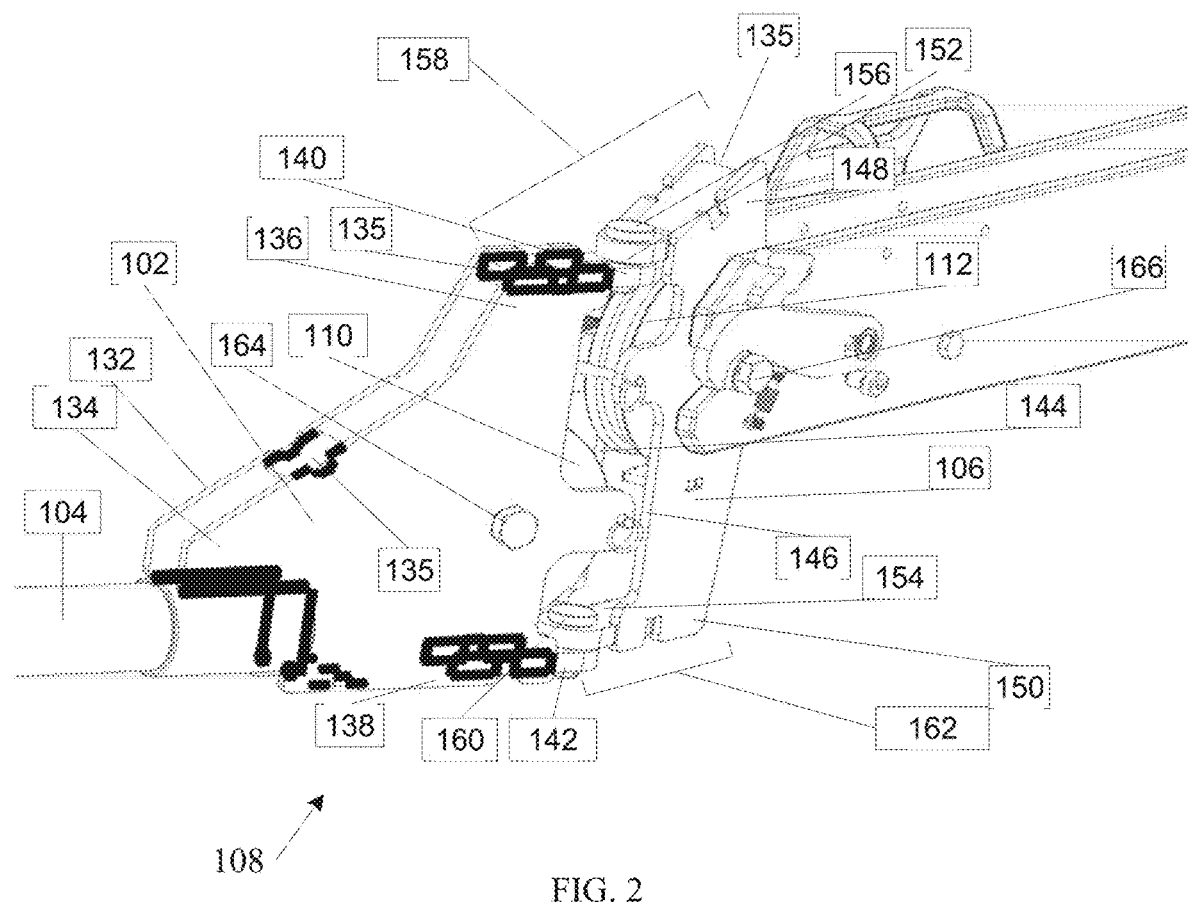
FIG. 2 illustrates an isometric view of a lateral positioning joint of the cable positioning assembly and pulling system, in accordance with at least one example of the present application.

FIG. 2 illustrates an isometric view of a lateral positioning joint 108 of the cable positioning assembly and pulling system 100, in accordance with at least one example of the present application. The lateral positioning joint 108 can include the winch mount 102, the winch fitting 104, the boom mount 106, the first pulley 110 and the second pulley 112. The winch mount 102 can further include a first winch mount plate 132 and a second winch mount plate 134. One or more plate couplers 135 can couple the first winch mount plate 132 to the second winch mount plate 134.

The winch mount 102 can include a winch mount first end 136 and a winch mount second end 138. The winch mount first end 136 can include a first winch mount knuckle 140. The first winch mount knuckle 140 can be coupled to the winch mount 102 between the first winch mount plate 132 and the second winch mount plate 134. The first winch mount knuckle 140 can also be coupled to a plate coupler 135. The winch mount second end 138 can include a second winch mount knuckle 142. The second winch mount knuckle 142 can be coupled to the winch mount 102 between the first winch mount plate 132 and the second winch mount plate 134. The first winch mount knuckle 140 can also be coupled to a plate coupler 135.

The boom mount 106 can include a first boom mount plate 144 and a second boom mount plate 146. One or more of the plate couplers 135 can couple the first boom mount plate 144 to the second boom mount plate 146. The boom mount 106 can include a boom mount first end 148 and a boom mount second end 150. The boom mount first end 148 can include a first boom mount knuckle 152. The first boom mount knuckle 152 can be coupled to the boom mount 106 between the first boom mount plate 144 and the second boom mount plate 146. The first boom mount knuckle 152 can be also coupled to a plate coupler 135. The boom mount second end 150 can include a second boom mount knuckle 154. The second boom mount knuckle 154 can be coupled to the boom mount 106 between the first boom mount plate 144 and the second boom mount plate 146. The second boom mount knuckle can be also coupled to a plate coupler 135.

The first winch mount knuckle 140, the second winch mount knuckle 142, the first boom mount knuckle 152, and the second boom mount knuckle 154 can generally form closed-loop shapes. The first winch mount knuckle 140 can be configured to engage with the first boom mount knuckle 152. A first hinge pin 156 can be inserted through the first winch mount knuckle 140 and the first boom mount knuckle 152 to form a first hinge 158. The second winch mount knuckle 142 can be configured to engage with the second boom mount knuckle 154. A second hinge pin 160 can be inserted through the second winch mount knuckle 142 and the second boom mount knuckle 154 to form a second hinge 162. The first hinge pin 156 and the second hinge pin 160 can be secured using various types of fasteners. For example, the first hinge pin 156 and the second hinge pin 160 can each include a bore at one end for a retaining pin to be inserted into, or a threaded end to engage with a threaded nut.

The first hinge 158 and the second hinge 162 can pivotably couple the winch mount 102 to the boom mount 106. The first hinge 158 and the second hinge 162 can rotate around a vertical axis generally defined by the first hinge pin 156 and the second hinge pin 160, respectively. The winch mount 102, the boom mount 106, the first hinge 158, and the second hinge 162 can form the lateral positioning joint 108. The lateral positioning joint 108 can have a 180-degree range of rotational motion. The lateral positioning joint 108 can also have a range of rotational motion between 90 and 160 degrees, 80 and 150 degrees, and 100 and 170 degrees.

The lateral positioning joint 108, including the winch mount 102, the boom mount 106, the first hinge 158, and the second hinge 162, can be robustly constructed to resist operational forces. The winch mount 102 and the boom mount 106 can each include one or more plate couplers 135 coupling the first winch mount plate 132 to the second winch mount plate 134, and the first boom mount plate 144 to the second boom mount plate 146, respectively. The plate couplers 135 can act as bracing elements positioned between the first winch mount plate 132 and the second winch mount plate 134, and between the first boom mount plate 144 and the second boom mount plate 146, ensuring the winch mount 102 and the boom mount 106 are sufficiently strong and rigid. Additionally, the first hinge 158 and the second hinge 162, which can couple the winch mount 102 to the boom mount 106, can be precisely and robustly constructed to ensure that the lateral positioning joint 108 can resist bending, compression, tension, torsion, and shear forces during a pulling operation.

The first pulley 110 can be coupled to the winch mount 102 with a first pulley axle 164. The second pulley 112 can be coupled to the boom mount 106 with a second pulley axle 166. The first pulley 110 and the second pulley 112 can rotate around a lateral axis generally defined by the first pulley axle 164 and the second pulley axle 166, respectively. The first pulley 110 and the second 112 pulleys can be configured to have a diameter sufficient to enable the pulleys to accommodate and pull large power cables or other types of cables, such as fiber optic cables. The first pulley axle 164 and the second pulley axle 166 can be bolts that pass laterally through the first boom plate 120 and the second boom plate 122. The first pulley axle 164 and the second pulley axle 166 can be secured using various types of fasteners. For example, the first pulley axle 164 and the second pulley axle 166 can include a bore at one end for a retaining pin to be inserted into, or a threaded end to engage with a threaded nut.

Figure 3:
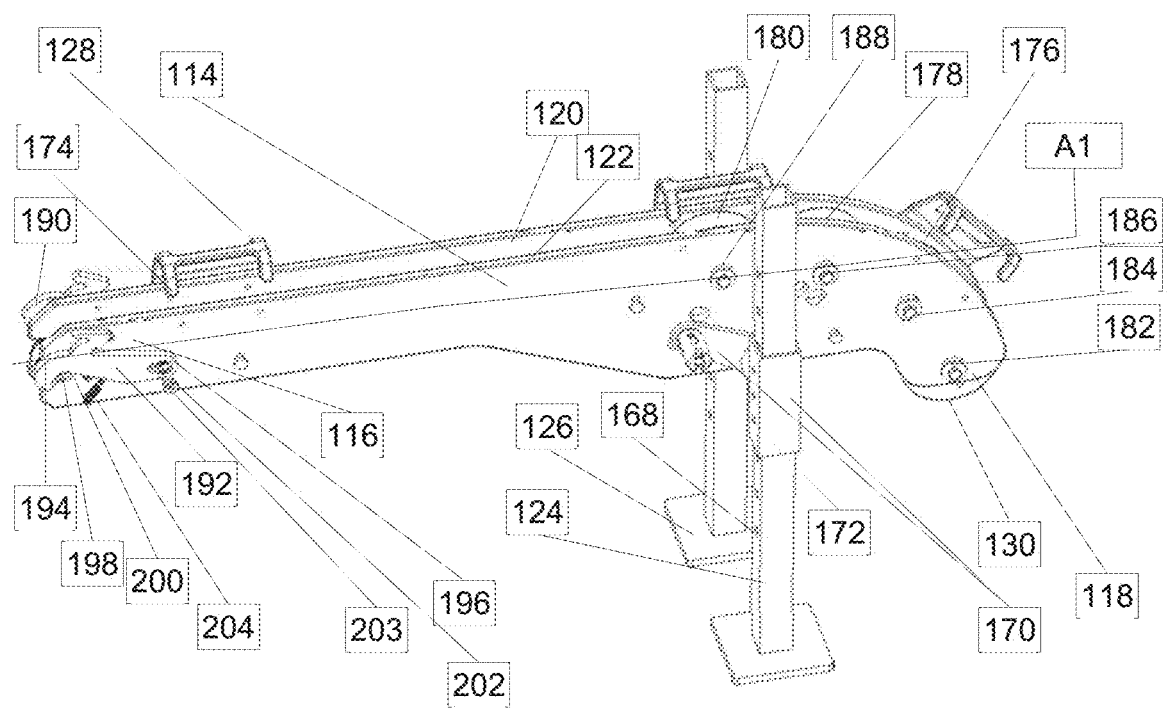
FIG. 3 illustrates an isometric view of a pulling boom of the cable positioning assembly and pulling system, in accordance with at least one example of the present application.

FIG. 3 illustrates an isometric view of the pulling boom 114 of the cable positioning assembly and pulling system 100, in accordance with at least one example of the present application. The pulling boom can include the supporting legs 124. The supporting legs can each include one or more leg apertures 168. The supporting legs 124 can be coupled to the pulling boom 114 between the first end 116 and the second end 118. The pulling boom 114 can include leg mounts 170. The leg mounts 170 can pivotably couple the supporting legs 124 to the pulling boom 114. The leg mounts 170 can include each include one or more mount apertures 172. The leg apertures 168 can engage with the mount apertures 172 to allow the supporting legs 124 to be height adjustable.

The leg mounts 170 can be configured to allow the supporting legs 124 to pivot around a lateral axis generally defined by the leg mounts 170, in order to pivot the supporting legs 124 between a transport orientation to an active orientation. In the transport orientation, the supporting legs 124 can extend generally parallel to the central axis A1. This can provide the benefit of transporting the pulling boom 114 more easily. In the active orientation, the supporting legs 124 can extend generally perpendicular to the central axis A1, in order to support and position the pulling boom 114 during a pulling operation.

The pulling boom 114 can include the handles 128. The handles 128 can be positioned between the first end 116 and the second end 118 of the pulling boom 114. One or more of the handles 128 can be positioned on one, or both, of the first boom plate 120 and the second boom plate 122. The handles 128 can generally comprise plates with gripping slots formed therein. The handles 128 can be coupled to the pulling boom in a fixed position with a variety of types of fasteners. For example, the handles 128 can be coupled to the pulling boom 114 with screws, bolts, or rivets. The handles 128 can also be welded to the pulling boom 114.

The handles 128 can also have a generally curved shape that can form a guard surface 174. The guard surface 174 of each handle 128 can extend substantially over and across a space generally defined between the first boom plate 120 and the second boom plate 122. The guard surface 174 of each handle 128 can prevent a pulling cable from moving away from the pulling boom 114 in the event of a pulling cable failure. The handles 128 can comprises a single piece of material, such as plate steel, that can provide both the benefits of convenient gripping points for handling the boom, as well as protection for the user against cable recoil.

The pulling boom 114 can include a third pulley 130. The third pulley 130 can be positioned at the second end 118 of the pulling boom 114. The pulling boom 114 can also include a fourth pulley 176, a fifth pulley 178, and a sixth pulley 180. The third pulley 130, fourth pulley 176, fifth pulley 178, and sixth pulley 180 can each be configured to guide a pulling cable. The third 182, the fourth 184, the fifth 186, and the sixth 188 pulley axles can respectively couple the third pulley 130, the fourth pulley 176, the fifth pulley 178, and the sixth pulley 180 to the pulling boom 114. The third pulley 130, the fourth pulley 176, the fifth pulley 178, and the sixth pulley 180 can each rotate around a lateral axis generally defined by a third 182, a fourth 184, a fifth 186, and a sixth 188 pulley axle, respectively.

The third pulley 130, the fourth pulley 176, the fifth pulley 178, and the sixth pulley 180 can be arranged at the second end 118 of the pulling boom 114, or otherwise arranged between the first end 116 and the second end 118 of the pulling boom. The third pulley 130, the fourth pulley 176, the fifth pulley 178, and the sixth pulley 180 can be configured to be coupled to the pulling boom 114 generally along a curvature of the second end 118 of the pulling boom 114. The third pulley 130, the fourth pulley 176, the fifth pulley 178, and the sixth pulley 180 can each be configured to have a diameter sufficient to enable the pulleys to accommodate and pull large power cables or other cables types, such as fiber optic cables. The third pulley 130, the fourth pulley 176, the fifth pulley 178, and the sixth pulley 180 can be configured to form a progressive curve having an overall radius sufficient to guide a pulling cable between the first boom plate 120 and the second boom plate 122 of the pulling boom 114.

The third 182, the fourth 184, the fifth 186, and the sixth 188 pulley axles can be bolts that pass laterally through the first boom plate 120 and the second boom plate 122. The third 182, the fourth 184, the fifth 186, and the sixth 188 pulley axles can be secured using various types of fasteners. For example, the third 182, the fourth 184, the fifth 186, and the sixth 188 pulley axles can each include a bore at one end for a retaining pin to be inserted into, or a threaded end to engage with a threaded nut.

The pulling boom 114 can include a first latch 190 and a second latch 192. The first latch 190 and the second latch 192 can each include a latch first end 194 and a latch second end 196. The latch first ends 194 of each of the first latch 190 and the second latch 192 can include latch recesses 198. The latch recesses 198 can be generally curved recesses formed in the first latch 190 and the second latch 192. The latch recesses 198 can be configured to engage the second pulley axle 166. The pulling boom 114 can include two boom recesses 200. One boom recess 200 can be formed in each of the first boom plate 120 and the second boom plate 122, at the first end 116 of the pulling boom 114. The boom recesses 200 can be configured to engage the second pulley axle 166.

The second latch ends 196 of each of the first latch 190 and the second latch 192 can be coupled to the pulling boom 114 with a latch fastener 202. The latch fastener 202 can be various types of fasteners, such as a threaded bolt configured to engage with the first boom plate 120, the second boom plate 122, or a threaded nut. The latch fastener 202 can allow the first latch 190 and the second latch 192 to pivot around a lateral axis generally defined by the latch fastener 202. An oblong slot 203 can also be formed in the second latch end 196 of either the first latch 190 or the second latch 192.

The first latch 190 and the second latch 192 can be configured to engage and disengage the second pulley axle 166 by pivoting. The first latch 190 or the second latch 192 can be coupled to a latch spring 204. A first end of the latch spring 204 can be coupled to a latch second end 196 of either the first latch 190 or the second latch 192. A second end of the latch spring 204 can be coupled to the first boom plate 120 or the second boom plate 122 of the pulling boom 114. The latch spring 204 can be configured to bias the first latch 190 or the second latch 192 toward the second pulley axle 166.

The winch mount 102, the winch fitting 104, the boom mount 106, the first pulley 110, the second pulley 112, the pulling boom 114, the first boom plate 120, the second boom plate 122, the supporting legs 124, the leg bases 126, the handles 128, the third pulley 130, the first hinge pin 156, the second hinge pin 160, the leg mounts 170, the fourth pulley 176, the fifth pulley 178, the sixth pulley 180, the third pulley axle 182, the fourth pulley axle 184, the fifth pulley axle 186, the sixth pulley axle 188, the first latch 190, the second latch 192, the latch fastener 202, and the latch springs 204 can each be made from steel, although the invention is not so limited. Other metals such as aluminum, or other metal alloys are also within the scope of the invention.

Figure 4A:
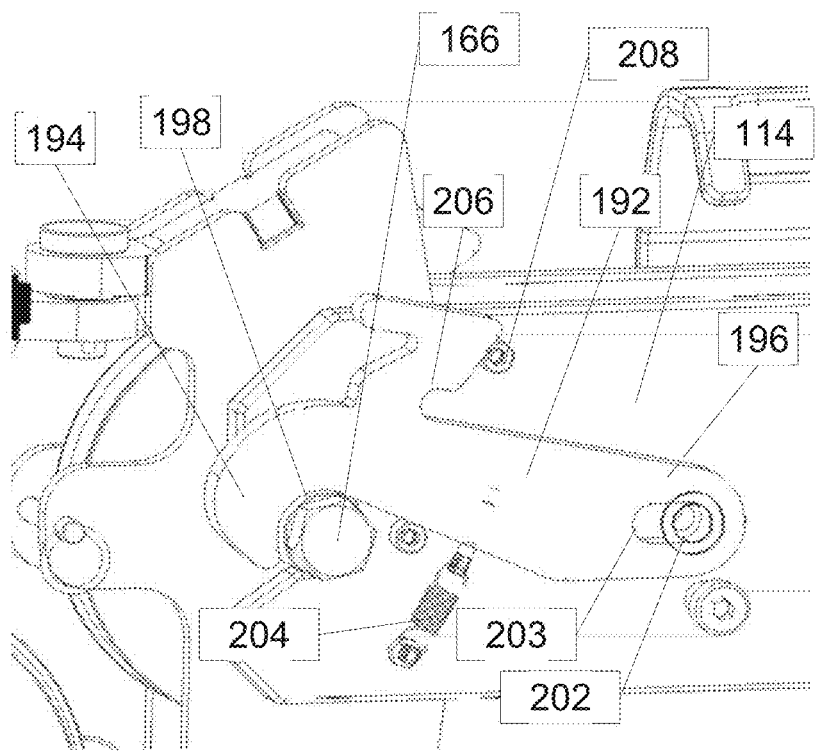
FIG. 4A illustrates an isometric view of the cable positioning assembly and pulling system in accordance with at least one example of the present application.
Figure 4B:
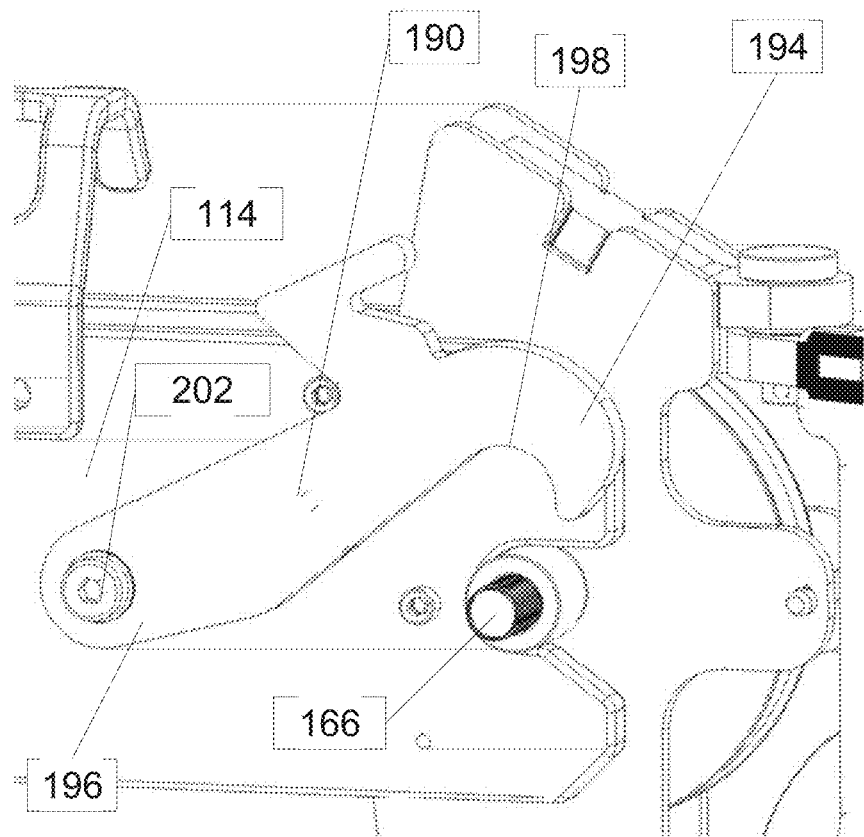
FIG. 4B illustrates an isometric view of the cable positioning assembly and pulling system in accordance with at least one example of the present application.

FIGS. 4A and 4B illustrate isometric views of the cable positioning assembly and pulling system 100 in accordance with at least two examples of the present application. The first latch 190 and the second latch 192 can each have a closed orientation and an open orientation. The first latch 190 and the second latch 192 can pivot between the closed orientation and the open configuration by rotating around a lateral axis generally defined by the latch fastener 202. When in the closed orientation, the first latch 190 and the second latch 192 can couple the first end 116 of the pulling boom 114 to the second pulley axle 166 as shown in FIG. 4A. When in the open orientation, the first latch 190 and the second latch 192 can allow the first end 116 of the pulling boom 114 to be de-coupled from the second pulley axle 166, as shown in FIG. 4B.

The cable positioning assembly and pulling system 100 can further include a latch retaining feature 206, and a latch retainer 208. The latch first ends 194 of either the first latch 190 or the second latch 192 can include the latch retaining feature 206. The latch retaining feature 206 can be a generally hook shaped projection formed on either the first latch 190 or the second latch 192. The latch retaining feature 206 can be configured to engage the latch retainer 208. The latch retainer 208 can be a bolt head, a dowel, or a protrusion extending laterally from first boom plate 120 or the second boom plate 122, of the pulling boom 114. The oblong slot 203 formed in the first latch 190 or the second latch 192 latches can allow the latch retaining feature 206 to engage the latch retainer 208. The oblong slot 203 formed in either of the first latch 190 or the second latch 192 can allow the first latch 190 or the second 192 latch to translate with respect to the latch fastener 202. When the first latch 190 or the second latch 192 translates, the latch retaining feature 206 can engage the latch retainer 208 to lock and secure the first latch 190, or the second latch 192, in the open orientation.

The latch retaining feature 206 can engage the latch retainer 208 and prevent either the first latch 190 or the second latch 192 from automatically returning to the closed orientation through gravity or from spring pressure from the latch spring 204. Advantageously, this can allow for a single person to de-couple the boom mount 106 from the pulling boom 114 after a pulling operation, as two persons would be otherwise be required to lift both the first latch 190 and the second latch 192, while simultaneously moving the boom mount 106 and second pulley axle 166 away from pulling boom 114.

In the operation of some examples, the boom mount 106 and the second pulley axle 166 can be inserted into the pulling boom 114, in a direction generally along the central axis A1. The latch first ends 194 of the first latch 190 and the second latch 192 can be shaped and configured to ride up and over a top surface of the second pulley axle 166, upon contact with the second pulley axle 166. The first latch 190 and the second latch 192 can be configured to close automatically under spring force generated by the latch spring 204 once the first latch 190 and the second latch 192 ride up and over a top surface of the second pulley axle 166.

In one example having one latch 190 that is always biased to a latching position provides enhanced safety while at the same time providing convenience for a single user. If an operator forgets to actuate the latch 190, it will fail safe (i.e. will stay latched if left unattended). In examples described, by allowing only one latch 192 to be held open while the first latch 190 is fail safe, provides a level of safety while also providing a convenience for a single user.

Figure 5:
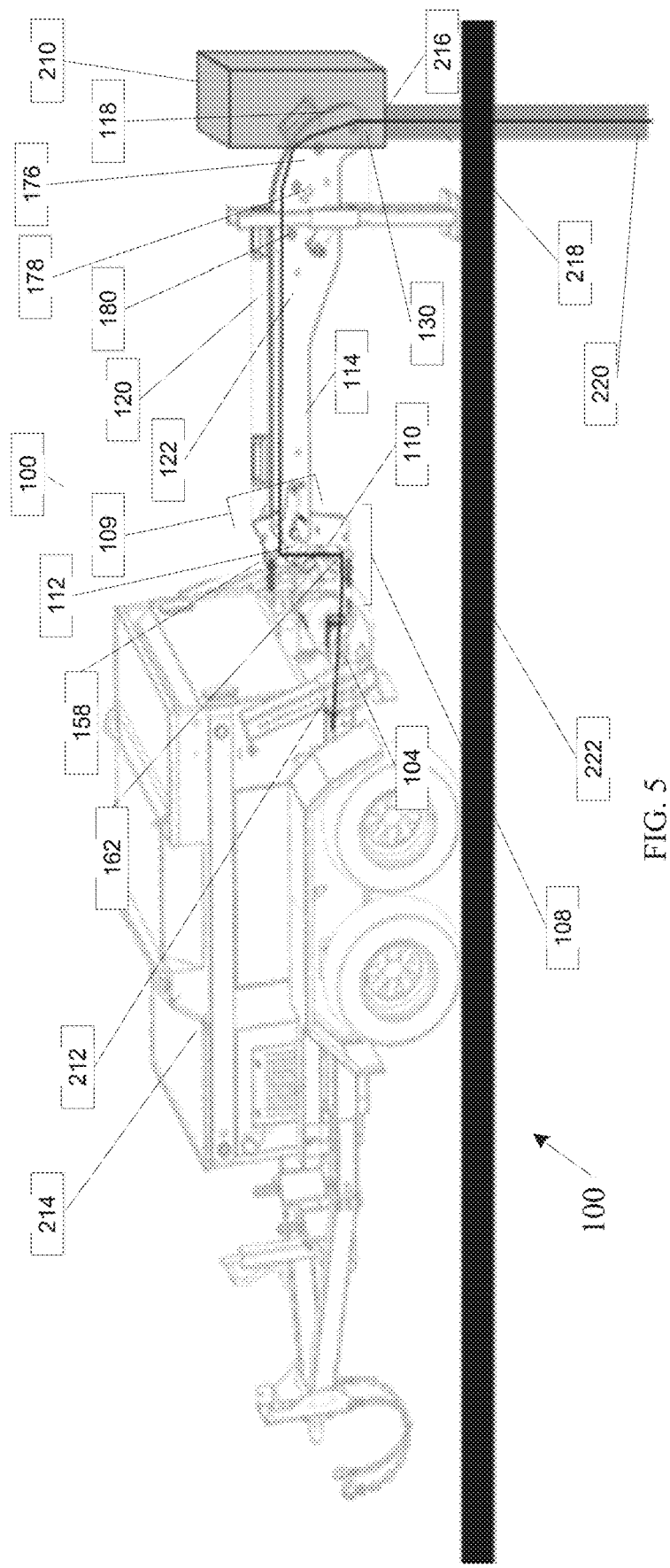
FIG. 5 illustrates a perspective view of an example of the cable positioning assembly and pulling system in operation.

FIG. 5 illustrates a perspective view of an example of the cable positioning assembly and pulling system 100 in operation. The example illustrated in FIG. 5 is not necessarily drawn to scale. The second end 118 of the pulling boom 114 can be positioned within an electrical box 210. A pulling cable 212 can be run from a power winch 214 through the winch fitting 104, the first pulley 110, the second pulley 112, and then along a length of the pulling boom 114 between the first boom plate 120 and the second boom plate 122, and then through the third pulley 130 at the second end 118 of the pulling boom 114. The pulling cable 212 can then be run into a proximal end 216 of a conduit 218 terminating inside the electrical box 210. The pulling cable 212 can then be run to a distal end 220 of the conduit 218, which can be located below a ground level 222. Electrical cables can then be coupled to the pulling cable, and the winch subsequently operated to pull the pulling cable 212, and any attached electrical cables, back through the conduit 212 into the electrical box 210.

The lateral positioning joint 108 can allow the pulling boom 114 to be moved laterally when attached to the power winch 214. The lateral positioning joint 108 can be compact, as a result of the proximity of the first pulley 110 with respect to the second pulley 112. The lateral positioning joint 108 can provide the benefit of easily rotating the pulling boom 114 side to side while maintaining the alignment of the pulling cable 212 between the first pulley 110 and the second pulley 112. Examples shown further include a first hinge and a second hinge, for example first hinge 158 and second hinge 162. By positioning the first pulley 110 and the second pulley 112 between the first hinge 158 and the second hinge 162, any bending moments that might be created during a cable pulling operation are countered both above and below the first pulley 110 and the second pulley 112. This configuration provides a robust joint that resists unwanted bending between the first pulley 110 and the first pulley 112, yet still allows lateral movement of the lateral positioning joint 108, all within a compact volume along the boom.

The vertical positioning joint 109 can allow the pulling boom 114 to be raised or lowered when attached to the power winch 214. The vertical positioning joint 109 can provide the benefit of easily rotating the pulling boom 114 up or down, while maintaining alignment of the pulling cable 212 between the first pulley 110, the second pulley 112, the third pulley 130, the fourth pulley 176, the fifth pulley 178, and the sixth pulley 180.

Figure 6:
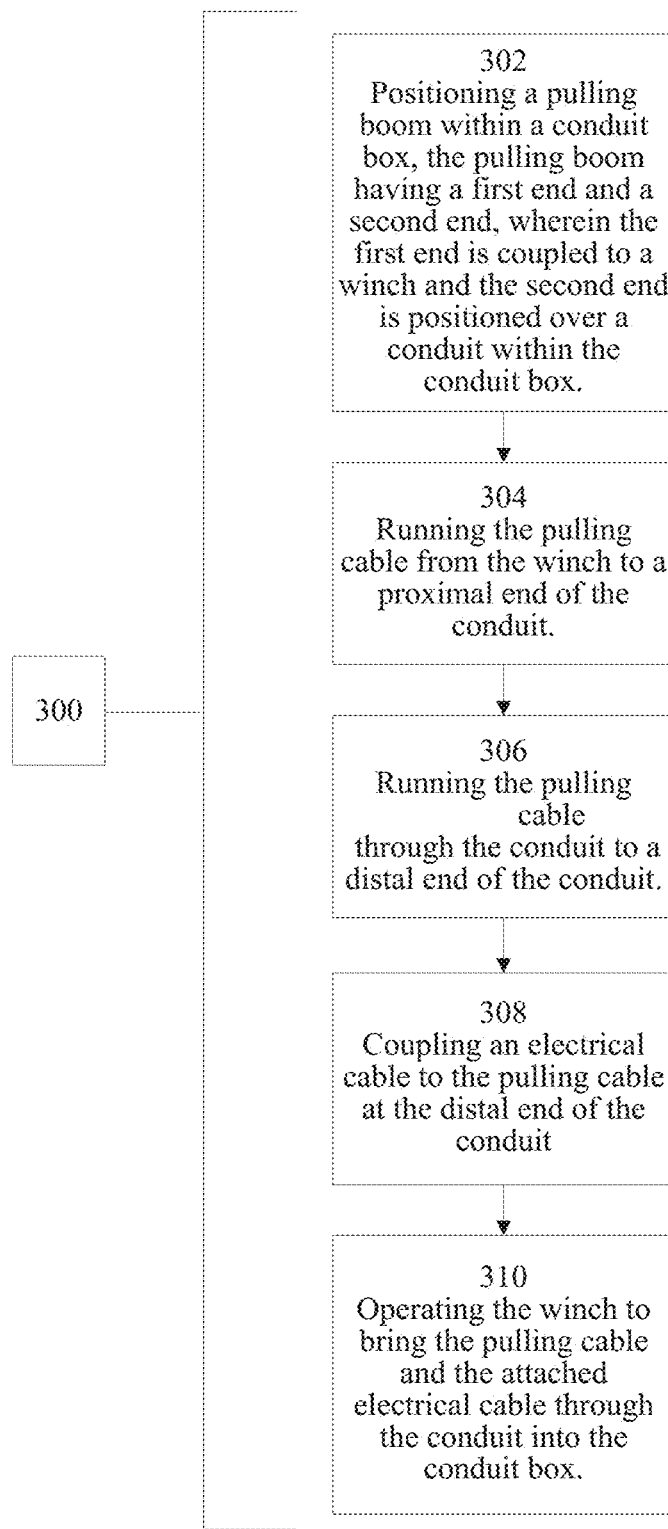
FIG. 6 illustrates a method for using the cable positioning assembly and pulling system in accordance with at least one example of the present application.

FIG. 6 illustrates a method 300 for using the cable positioning assembly and pulling system, in accordance with at least one example of the present application. The steps or operations of the method 300 are illustrated in a particular order for convenience and clarity; many of the discussed operations can be performed in a different sequence or in parallel without materially impacting other operations. The method 300 as discussed includes operations that can be performed by multiple different actors, devices, and/or systems. It is understood that subsets of the operations discussed in the method 300 can be attributable to a single actor, device, or system could be considered a separate standalone process or method.

In one or more examples, a first step 302 can be positioning a pulling boom within a conduit box, the pulling boom having a first end and a second end, wherein the first end is coupled to a winch and the second end is positioned over a conduit within the conduit box. In one or more examples, a second step 304 can be running the pulling cable from the winch to a proximal end of the conduit. In one or more examples, a third step 306 can be running the pulling cable through the conduit to a distal end of the conduit. In one or more examples, a fourth step 308 can be coupling an electrical cable to the pulling cable at the distal end of the conduit. In one or more examples, a fifth step 310 can be operating the winch to bring the pulling cable and the attached electrical cable through the conduit into the conduit box.

In one or more examples, the first step 302 can include positioning the pulling boom further includes positioning a lateral positioning joint, the lateral positioning joint coupling the winch to the pulling boom. In one or more examples, the first step 302 can include positioning the pulling boom further includes positioning a vertical joint, the vertical joint coupling the lateral positioning joint to the pulling boom. In one or more examples, the first step 302 can include positioning adjustable supporting legs coupled to the pulling boom to support the pulling boom over the proximal end of the conduit.

Notes and Examples

The following, non-limiting examples, detail certain aspects of the present subject matter to solve the challenges and provide the benefits discussed herein, among others.

Example 1 is a cable positioning assembly, comprising: a winch mount having a first end and a second end; a first pulley coupled to the winch mount, the first pulley rotatable about a first lateral axis; a boom mount having a first end and a second end; a second pulley coupled to the boom mount, the second pulley rotatable about a second lateral axis; a first hinge pivotably coupling the first end of the winch mount to the first end of the boom mount; a second hinge pivotably coupling the second end of the of the winch mount to the second end of the boom mount; wherein the first and second hinges form a lateral positioning joint, the lateral positioning joint rotatable about a first vertical axis; and wherein the first and second pulleys are positioned between the first hinge and the second hinge.

In Example 2, the subject matter of Example 1 optionally includes wherein the winch mount further includes a fitting configured to engage with a winch and couple the cable positioning assembly to the winch.

In Example 3, the subject matter of any one or more of Examples 1-2 optionally include a vertical joint coupling the boom mount to a pulling boom, the pulling boom having a first end and a second end, wherein the vertical joint is rotatable about a third lateral axis.

In Example 4, the subject matter of Example 3 optionally includes wherein the pulling boom is curved.

In Example 5, the subject matter of any one or more of Examples 3-4 optionally include wherein the pulling boom includes adjustable supporting legs.

In Example 6, the subject matter of Example 5 optionally includes wherein the adjustable supporting legs are positioned between a first end and a second end of the pulling boom.

In Example 7, the subject matter of any one or more of Examples 3-6 optionally include a third pulley coupled to the second end of the pulling boom.

In Example 8, the subject matter of any one or more of Examples 3-7 optionally include a plurality of pulleys coupled to the pulling boom between the first end and the second end.

In Example 9, the subject matter of any one or more of Examples 1-8 optionally include degree range of rotational motion.

Example 10 is a cable pulling system, comprising: a cable positioning system including: a winch mount having a first end and a second end; a first pulley coupled to the winch mount, the first pulley rotatable about a first lateral axis; a boom mount having a first end and a second end; a second pulley coupled to the boom mount, the second pulley rotatable about a second lateral axis; a first hinge pivotably coupling the first end of the winch mount to the first end of the boom mount; a second hinge pivotably coupling the second end of the of the winch mount to the second end of the boom mount; wherein the first and second hinges form a lateral positioning joint, the lateral positioning joint rotatable about a first vertical axis; wherein the first and second pulleys are positioned between the first hinge and the second hinge; and a pulling boom having a first end to couple the cable positioning assembly to the pulling boom and a second end to deploy over a conduit; wherein the pulling boom is coupled to the boom mount with a vertical joint, the vertical joint rotatable about a third lateral axis.

In Example 11, the subject matter of Example 10 optionally includes wherein the winch mount further includes a fitting configured to engage with a winch and couple the cable pulling system to the winch.

In Example 12, the subject matter of any one or more of Examples 10-11 optionally include wherein the pulling boom is curved.

In Example 13, the subject matter of any one or more of Examples 10-12 optionally include wherein the pulling boom includes adjustable supporting legs.

In Example 14, the subject matter of any one or more of Examples 10-13 optionally include degree range of rotational motion.

In Example 15, the subject matter of any one or more of Examples 10-14 optionally include degrees.

Example 16 is a method for pulling electrical cable into a conduit box, the method comprising: positioning a pulling boom within a conduit box, the pulling boom having a first end and a second end, wherein the first end is coupled to a winch and the second end is positioned over a conduit within the conduit box; running the pulling cable from the winch to a proximal end of the conduit; running the pulling cable through the conduit to a distal end of the conduit; coupling an electrical cable to the pulling cable at the distal end of the conduit; operating the winch to bring the pulling cable and the attached electrical cable through the conduit into the conduit box.

In Example 17, the subject matter of Example 16 optionally includes wherein positioning the pulling boom further includes positioning a lateral positioning joint, the lateral positioning joint coupling the winch to the pulling boom.

In Example 18, the subject matter of any one or more of Examples 16-17 optionally include wherein positioning the pulling boom further includes positioning a vertical joint, the vertical joint coupling the lateral positioning joint to the pulling boom.

In Example 19, the subject matter of any one or more of Examples 16-18 optionally include wherein positioning the pulling boom further includes positioning adjustable supporting legs coupled to the pulling boom to support the pulling boom over the proximal end of the conduit.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein. In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B"

includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A cable positioning assembly, comprising:
   a winch mount having a first end and a second end;
   a first pulley coupled to the winch mount, the first pulley rotatable about a first lateral axis;
   a boom mount having a first end and a second end;
   a second pulley coupled to the boom mount, the second pulley rotatable about a second lateral axis;
   a first hinge pivotably coupling the first end of the winch mount to the first end of the boom mount;
   a second hinge pivotably coupling the second end of the of the winch mount to the second end of the boom mount;
   wherein the first and second hinges form a lateral positioning joint, the lateral positioning joint rotatable about a first vertical axis; and
   wherein the first and second pulleys are positioned between the first hinge and the second hinge.

2. The cable positioning assembly of claim 1, wherein the winch mount further includes a fitting configured to engage with a winch and couple the cable positioning assembly to the winch.

3. The cable positioning assembly of claim 1, further comprising a vertical joint coupling the boom mount to a pulling boom, the pulling boom having a first end and a second end, wherein the vertical joint is rotatable about a third lateral axis.

4. The cable positioning assembly of claim 3, wherein the pulling boom is curved.

5. The cable positioning assembly of claim 3, wherein the pulling boom includes adjustable supporting legs.

6. The cable positioning assembly of claim 5, wherein the adjustable supporting legs are positioned between a first end and a second end of the pulling boom.

7. The cable positioning assembly of claim 3, wherein the pulling boom includes a first latch and a second latch pivotably coupled to the pulling boom, the first latch and the second latch operable to rotate around a lateral axis to couple the boom mount to the pulling boom.

8. The cable positioning assembly of claim 7, wherein the first latch is spring-closed, and the second latch includes a latch retaining feature operable to engage with a latch retainer to prevent the second latch from rotating to close.

9. The cable positioning assembly of claim 1, wherein the lateral positioning joint has a 180 degree range of rotational motion.

10. A cable pulling system, comprising:
    a cable positioning assembly including:
    a winch mount having a first end and a second end;
    a first pulley coupled to the winch mount, the first pulley rotatable about a first lateral axis;
    a boom mount having a first end and a second end;
    a second pulley coupled to the boom mount, the second pulley rotatable about a second lateral axis;
    a first hinge pivotably coupling the first end of the winch mount to the first end of the boom mount;
    a second hinge pivotably coupling the second end of the of the winch mount to the second end of the boom mount;
    wherein the first and second hinges form a lateral positioning joint, the lateral positioning joint rotatable about a first vertical axis;
    wherein the first and second pulleys are positioned between the first hinge and the second hinge; and
    a pulling boom having a first end to couple the cable positioning assembly to the pulling boom and a second end to deploy over a conduit;
    wherein the pulling boom is coupled to the boom mount with a vertical joint, the vertical joint rotatable about a third lateral axis.

11. The cable pulling system of claim 10, wherein the winch mount further includes a fitting configured to engage with a winch and couple the cable pulling system to the winch.

12. The cable pulling system of claim 10, wherein the pulling boom is curved.

13. The cable positioning assembly of claim 10, wherein the pulling boom includes a first latch and a second latch pivotably coupled to the pulling boom, the first latch and the second latch operable to rotate around a lateral axis to couple the boom mount to the pulling boom.

14. The cable positioning assembly of claim 13, wherein the first latch is spring-closed, and the second latch includes a latch retaining feature operable to engage with a latch retainer to prevent the second latch from rotating to close.

15. The cable pulling system of claim 10, wherein the lateral positioning joint has a 180 degree range of rotational motion.

16. The cable pulling system of claim 10, wherein the vertical joint has a range of rotational motion between 90 and 160 degrees.

* * * * *